United States Patent [19]

Dietz et al.

[11] Patent Number: 4,534,240
[45] Date of Patent: Aug. 13, 1985

[54] ACTUATING KNOB, PARTICULARLY FOR WINDOW CRANKS OF AUTOMOTIVE VEHICLES

[75] Inventors: Günter Dietz; Friedhelm Flagmeyer, both of Wuppertal, Fed. Rep. of Germany

[73] Assignee: Gebr. Happich GmbH, Fed. Rep. of Germany

[21] Appl. No.: 493,631

[22] Filed: May 11, 1983

Related U.S. Application Data

[63] Continuation of Ser. No. 196,932, Oct. 14, 1980, abandoned.

[30] Foreign Application Priority Data

Dec. 22, 1979 [DE] Fed. Rep. of Germany ....... 2952057

[51] Int. Cl.³ .......................... G05G 1/02; B25G 3/00
[52] U.S. Cl. ..................................... 74/545; 403/248; 16/121
[58] Field of Search .......................... 74/545; 292/353; 403/290, 248, 249; 16/121, DIG. 24, DIG. 30

[56] References Cited

U.S. PATENT DOCUMENTS

| 485,678 | 11/1892 | Ash | 403/248 |
| 2,938,405 | 5/1960 | West | 74/545 |
| 2,978,927 | 4/1961 | Blanton | 74/545 |
| 4,052,768 | 10/1977 | Yamazaki et al. | 74/545 |

FOREIGN PATENT DOCUMENTS

| 1950978 | 1/1966 | Fed. Rep. of Germany . | |
| 7303571 | 1/1973 | Fed. Rep. of Germany . | |
| 2204480 | 8/1973 | Fed. Rep. of Germany | 74/531 |
| 2453484 | 12/1975 | Fed. Rep. of Germany . | |
| 2817127 | 11/1978 | Fed. Rep. of Germany . | |
| 2236374 | 1/1975 | France . | |
| 1217393 | 12/1970 | United Kingdom . | |
| 1429298 | 3/1976 | United Kingdom . | |
| 1434300 | 5/1976 | United Kingdom . | |
| 2046192 | 11/1980 | United Kingdom | 16/121 |

Primary Examiner—Kenneth J. Dorner
Attorney, Agent, or Firm—Ostrolenk, Faber, Gerb & Soffen

[57] ABSTRACT

The disclosure concerns an actuating knob which is particularly useful for the window crank of an automotive vehicle, wherein the actuating knob is adapted to break off in the event of high impact. The knob comprises an outer knob part to be grasped and an inner knob part which serves as a pivot pin for the outer knob part. A tapered thickness region of the pivot pin is adapted to break off upon impact. Detent pins beneath the pivot pin connect with the crank arm. A blocking member installed between the detent pins holds them apart and the blocking member is detent connected to the pivot pins to prevent subsequent removal. The pivot pin has a widened lower borehole for receiving the blocking member and a narrowed diameter upper portion of that serves as the pivot pin for the outer knob part.

12 Claims, 5 Drawing Figures

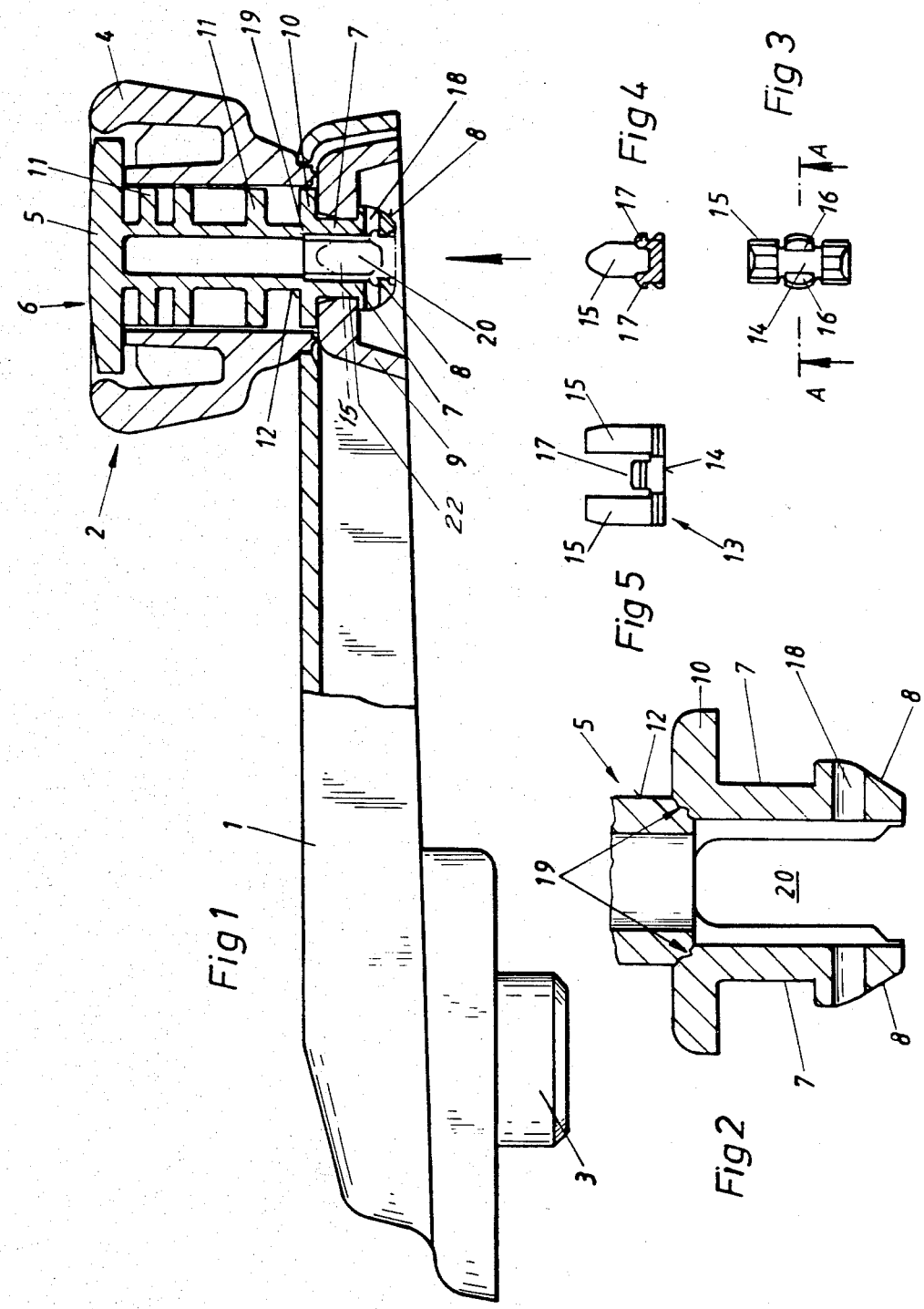

ACTUATING KNOB, PARTICULARLY FOR WINDOW CRANKS OF AUTOMOTIVE VEHICLES

RELATED APPLICATIONS

This is a continuation of U.S. patent application Ser. No. 196,932 filed Oct. 14, 1980, and now abandoned.

BACKGROUND OF THE INVENTION

The present invention relates to an acutating knob, particularly for the window crank of an automotive vehicle.

An actuating knob of this type is shown in Federal Republic of Germany Utility Model (Gebrauchsmuster) No. 73 03 571. This actuating knob has an outer relatively soft knob part and an inner load-bearing knob part of relatively hard material which serves as a pivot pin. This arrangement is intended to avoid impact injuries which might occur upon automobile accidents. However, experience has shown that the elasticity of the material itself is insufficient in practically all cases to achieve the necessary damping and counteracting of an impact, for instance, with the head, knee, etc.

In another actuating knob shown in Federal Republic of Germany Utility Model No. 19 50 978, a connection adapted to release upon lateral pressure on the knob is provided between the knob and the connecting part. The knob is intended to loosen automatically from its mount under an impact force and to drop off. This also has defects. Very narrow tolerances must be maintained, and this complicates the manufacture and makes it more expensive. However, even if narrow tolerances are maintained, the desired effect is not reliably assured, since the plastic material of which operating knobs are generally produced expands at high temperatures and contracts at low temperatures. Accordingly, despite increased impact force, the actuating knob might not release from its mount and would cause impact injuries. It is also possible for the knob to become unintentionally loosened upon actuation and be lost. This known actuating knob has the further advantage that the shaft section of the knob is seated in a borehole in the crank arm. The knob engages, by means of a collar-like widening, over the end surface of the bore hole, which faces away from the knob. This secures the knob in the axial direction. Upon a tilting moment being applied to the knob, which is unavoidable upon actuation of the crank, the collar cannot prevent canting of the shaft in the borehole and cannot prevent the increased bearing friction caused by the tilting moment. The radial component of force which applies the tilting moment acts on a lever arm which extends from the actuating knob up to the end of the borehole facing away from the knob. The tilting moment and the disturbing impairment in the slidability of the shaft in the support borehole of the crank arm increase with the length of this lever arm.

SUMMARY OF THE INVENTION

The invention is directed at developing an actuating knob which is simple and economical to manufacture, which permits easy rotational sliding of the knob in normal operation and which also avoids impact injuries.

It is a further object of the invention to provide such a knob that when a load within predetermined limits which exceeds the elasticity of the material of the outer part of the knob is applied to the knob, this causes breaking of the mount with great reliability and independently of the environmental conditions.

In accordance with the invention, therefore, first the resilience of the material of the outer knob is utilized. Then the inner part of the knob is adapted to break off. This has the advantage that dangerous impacts are avoided.

The inner part is held to the outer part by detent pins on the inner part, and the detent pins are spread apart by an inserted blocking member. Since the detent pins are held at a distance apart by the blocking member, it is not possible for the pins to loosen out of their mount or for the intended break point of the inner part of the knob to lose its effect. Rather, upon increased impact force, the inner part of the knob will break at the exact point preestablished and will also do so without leaving the accessible sharp edges.

Other objects and features of the invention will be apparent from the following description and accompanying drawings.

BRIEF DESCRIPTION OF THE DRAWINGS

The invention will be described in further detail below with reference to the drawings in which one illustrative embodiment of the invention is shown.

FIG. 1 is a vertical sectional view of an actuating knob according to the invention mounted on a window crank;

FIG. 2 is a cross-sectional view of a detail of the actuating knob of FIG. 1;

FIG. 3 is a top view of a blocking member for the actuating knob;

FIG. 4 is a section along the line A—A of FIG. 3; and

FIG. 5 is a side view of FIG. 4.

DESCRIPTION OF THE PREFERRED EMBODIMENT

FIG. 1 shows a window crank which carries the actuating knob 2 on the free end of its crank arm 1. The hub 3 seated on the end of the crank arm is detachably connected in the conventional manner with the pin of a stationary window gearing (not shown) which is to be driven.

The actuating knob 2 is comprised of an outer knob part 4, which serves as a grip and is formed of relatively soft plastic, and of an inner knob part, which is developed as a hollow pivot pin 5 and is formed of a relatively hard plastic. The pivot pin has a head flange 6 at one end which in part engages over the knob part 4 and secures it from being pulled out. At its other end, the pivot pin 5 has two detent pins 7 which are spaced apart from each other and extend parallel to each other. They have detent projections 8 formed on their outer surfaces. The detent pins 7 are formed on a flange 10 which rests against the connecting part 9 of the crank arm 1. Further radial flanges 11 spaced outwardly along the length of the flange 10 guide the travel of the outer knob part 4 which has a corresponding borehole in which the flange 10 is received. Adjoining the flange 10 on the side thereof facing away from the detent pins 7, there is a pivot-pin region 12 which is narrowed in diameter as compared with the pins 7 and the flange 10.

For the mounting of the actuating knob 2, the outer knob part 4 is first pushed over the pivot pin 5. Then the completed actuating knob is applied to the crank arm 1. For this it is merely necessary to push the detent pins 7 through a non-circular opening 22 in the connecting part 9 which is narrower in cross-section than the cross-section occupied by the related detent pins. The detent pins 7 spring toward each other upon insertion and then return back again as soon as the detent projections 8 have passed the opening 22 and the pins engage the edges of the connecting part defining the opening 22. The pivot pin 5 is thus mounted fixed against rotation while the outer knob part 4 is rotatable.

To prevent the detent pins 7 from loosening from their attachment upon an impact on the actuating knob 2, the pins are blocked by a blocking member 13 seated between them, which holds them at their normal spacing from each other. In FIG. 1 the blocking member 13 is shown in dash-dot line.

Referring to FIGS. 3 to 5, the blocking member 13 has a U-shaped development with a crossbar 14 and two upstanding side arms 15 whose free ends are rounded. As shown in FIG. 1, the side arms 15 occupy the space between the pins 7. The side arms are of rectangular cross-section. Between the side arms 15, the crossbar 14 has two lateral opposed detent spring arms 16 with detent projections 17 arranged on their outward sides. The blocking member 13 can be inserted by hand between the detent pins 7. The member 13 has a self-supporting mount through the detent projections 17 engaging into slots 18 provided for this purpose in the detent pins 7.

To enable the actuating knob 2, which is fixed reliably in this manner to the crank arm 1, to break away upon an excessive impact force, the pivot pin 5 has a well-defined, annular, intended point of breakage 19. The position of this along pin 5 can be noted from FIG. 2, where the annular break is indicated. The hollow space inside the pivot pin 5 is developed as a stepwise borehole whose step 20 of larger diameter, extending form the detent pins 7, terminates in the transition region from the flange 10 to the narrowed pivot-pin region 12 with the formation of a circumferential cross-sectional tapering of reduced thickness, as compared with region 12 and flange 10 adjacent thereto. The borehold step 20 removes a region of a shape of a circular segment, as seen in cross-section, from each of the detent pins. The cross-section of the borehole opening tapers narrower at the transition region between the region 12 and pins 7, helping to define the point of breakage 19. For this reason also, the detent projections 17 of the blocking member 13 are correspondingly rounded on the outside.

Although the present invention has been described in connection with a preferred embodiment thereof, many variations and modifications will now become apparent to those skilled in the art. It is preferred, therefore, that the present invention be limited not by the specific disclosure herein, but only by the appended claims.

We claim:

1. In an automotive vehicle having a window crank, said window crank having a breakaway actuating knob, said knob comprising:
   an outer knob part for serving as a grip; an inner knob part surrounded by the outer knob part; the inner knob part serving as a pivot pin and the outer knob part having a recess therein in which the pivot pin is received;
   the pivot pin being insertable into an opening of said window crank; the pivot pin including detent pins and the detent pins including outward projections thereon for clip mounting of the pivot pin on a connection part defined in the opening of the window crank on which the actuating knob is used;
   a blocking member being installed between the detent pins for holding the detent pins apart and for urging the outward projections to the connecting part for preventing separation of the outward projections from the connecting part;
   the pivot pin having a breakaway section defined along the pivot pin by a stepped borehole within said pivot pin; said outward projections including a flange extending outwardly from said pivot pin at the location of said step in said borehole; said connecting part comprising a support in said opening of said crank having a surface receiving and positioning said flange; any bending movement on said pivot pin being transmitted to the said meetng surfaces of said flanges and said support and thereby being concentrated at said step in said borehole to cause any break which occurs to occur at the location of said step in said borehole.

2. The combination of claim 1, wherein the breakaway section is defined by a narrowing of the thickness of the pivot pin.

3. The combination of claim 1, further comprising detent means on the blocking member and on at least one detent pin for holding the blocking member to the detent pins.

4. The combination of claim 3, wherein the detent means comprises a detent recess in at least one of the detent pins and comprises a detent projection on the blocking member, which can be engaged in the detent recess; a detent spring arm on the blocking member supporting the detent projection.

5. The combination of claim 4, wherein there are two of the detent pins extending parallel to each other and each has the detent recess therein in the form of a slot passing through the detent pin; the blocking member having a respective detent projection for each of the slots.

6. The combination of claim 5, wherein the blocking member is generally U-shaped, with a cross arm at the end of the pivot pin toward the connecting part; the blocking member having two side arms defining the U-shape thereof and extending up through the spaces between the two detent pins for holding the detent pins apart; two upstanding spring detent arms on the cross arms of the blocking member and each of the detent arms having a respective one of the detent projections defined thereon.

7. The combination of either of claims 1 or 6, wherein the side of the pivot pin away from the detent pins and toward the outside of the knob having a narrowed diameter region; the pivot pin borehole having a cross-section which is narrower in the transition from the attachment flange to the narrowed diameter region of the pin.

8. The combination of claim 7, wherein the breakaway section of the pivot pin is defined at the transition to the narrowed diameter region of the pivot pin.

9. The combination of claim 3, wherein there are two of the detent pins extending parallel to each other and spaced apart.

10. The combination of claim 9, wherein the blocking member is generally U-shaped, with a cross arm at the end of the pivot pin toward the connecting part of the window crank; the blocking member havng two side arms defining the U-shape thereof and extending up through the space between the two detent pins for holding the detent pins apart.

11. The combination of any of claims 1, 2, 3, 6 or 10, wherein the outer knob part is outside the opening of the window crank.

12. The combination of claim 11, wherein the breakaway section is located along the pivot pin to be slightly inside the opening into the window crank.

* * * * *